United States Patent

Winston et al.

[15] 3,657,056
[45] Apr. 18, 1972

[54] ULTRASONIC SUTURING APPARATUS

[72] Inventors: Ronald H. Winston, New York, N.Y.; Stephen Schultz, Chapel Hill, N.C.; Thomas Q. Garvey, III, Chevy Chase, Md.

[73] Assignee: Ultrasonic Systems, Inc., Plainview, N.Y.

[22] Filed: Mar. 11, 1970

[21] Appl. No.: 18,519

Related U.S. Application Data

[62] Division of Ser. No. 689,634, Dec. 11, 1967, Pat. No. 3,513,848.

[52] U.S. Cl..................................156/580, 156/73, 228/1
[51] Int. Cl.................................B29c 27/08, B32b 31/16
[58] Field of Search.....................156/580, 73, 433; 228/1

[56] References Cited

UNITED STATES PATENTS

| 3,184,363 | 5/1965 | Strother | 156/433 |
| 3,053,124 | 9/1962 | Balamuth et al. | 228/1 |
| 3,386,870 | 6/1968 | Morin | 156/580 X |

Primary Examiner—Benjamin A. Borchelt
Assistant Examiner—J. J. Devitt
Attorney—Leonard W. Suroff

[57] ABSTRACT

The invention deals with the method and apparatus for forming sutures utilizing ultrasonic vibrational energy as well as the sutures formed thereby. The sutures are formed in biological organisms, such as humans, in a manner to substantially eliminate the loosening of the suture after its formation. In one form of the invention, tie offs in the form of knots as presently practiced are eliminated and overlapping portions of the suture are ultrasonically bonded or welded together without first forming a knot. In another form of the invention the ultrasonic vibrational energy is applied to the knot portion of the suture to prevent slippage and loosening thereof as stresses are applied thereto by normal body movement or in particular by the muscular system. The ultrasonic mechanical vibrations are applied to thermoplastic suture materials that are in either the plastic or metallic family, or of a natural or synthetic polymeric material.

7 Claims, 21 Drawing Figures

INVENTORS
RONALD H. WINSTON
STEPHEN SCHULTZ
BY THOMAS Q. GARVEY, III

*Leonard Lunoff*
ATTORNEY

PATENTED APR 18 1972   3,657,056

INVENTORS.
RONALD H. WINSTON
STEPHEN SCHULTZ
BY THOMAS Q. GARVEY, III

*Leonard W. Suroff*
ATTORNEY

ULTRASONIC SUTURING APPARATUS

CROSS-REFERENCE TO RELATED APPLICATION

This is a division of application Ser. No. 689,634, filed Dec. 11, 1967 now U.S. Pat. 3,513,848 issued on May 26, 1970.

BACKGROUND OF THE INVENTION

The present invention relates generally to improvements in suturing and more particularly to an improved suture and the methods and apparatus for forming same with ultrasonic mechanical vibrational energy.

Before proceeding to the details of the present invention, let us first review briefly generally known facts of suturing and the difficulties associated therewith. Suturing is broadly defined as the joining of the adjacent surfaces, lips or edges of a wound, laceration, or the like by stitching or some similar process. Present suturing techniques employ a variety of suture materials which generally are of a metallic or polymeric material. The aim of the surgeon in suturing is to hold the wound edges in apposition, against the forces of disruption, until healing has occurred and at the same time, to incur for the patient as little pain, discomfort and morbidity as possible. This applies to all types of wounds, either surgically or non-surgically inflicted.

Most of the suturing in surgical procedures remains hidden and is also applied to tying off small arterial bleeders which are clamped and tied off as the surgeon cuts through the body layers. Suturing is also applied to the residue of excised body organs. The present invention applies to these sutures as well.

Although various suturing techniques are known to obtain either a row of individual sutures or a series of interlocking loops, each end of the suture must in some manner be secured in place to prevent it from slackening. The problem of slackening is present in both the forming of a single suture or in a row of interlocking sutures. In some instances it is necessary that an assistant help the operator to maintain the tension until the last of a row of interlocking sutures is formed. The overlapping ends of the suture are either tied together to form a knot or the end of the suture material may be secured to a button like object, but in either case a knot is relied on as the positive engagement to retain the suture under the proper tension. This tension can vary with the location of the suture in the biological organism. For example in abdominal wounds, the forces of disruption are often provided by the tensions in the musculoaponeurotic layers of the abdominal wall produced by muscle contractions, aided to a greater or lesser extent by abdominal distension due to ileus or obstruction. The forces which voluntary muscles can generate, and apply as stresses to the sutures, are much greater than most people realize. Actual experimentation has indicated that those forces vary for different muscles, and that the quadriceps femoris in a strong man can produce a tension of at least 1,300 lb. For the calf muscles of the figure is 1,100 lb.

In the early post operative phase, the suture must resist these strong forces to hold the wound edges in apposition. It is a major aim of this invention to permit the surgeon to obtain sutures having the necessary strength to withstand forces at least equal to the shear point of the suture.

Present techniques of suturing have limited the use of various otherwise suitable materials presently available. Suture materials generally in a fine thread or wire form, such as Nylon, Dacron, catgut, silk, cotton, which for purposes of discussion may all be considered to be in the polymeric family, and metal wires, such as stainless steel and other metallic materials may be employed for suturing. Common to all of these and other known suturing materials is the time consuming and difficult procedure of tying a knot (which is most generally a square knot). An even more important factor is the prevention of slippage and loosening of the knot as continued tension is applied.

Due to the difficulties in using certain synthetic plastic materials, such as Dacron, catgut, which is made from sheep's intestines, is still used by a majority of surgeons for suturing peritoneal and aponeurotic layers, and tying off cut ends of blood vessels, even though it has certain definite disadvantages. Since catgut is a dead animal tissue it can act as a pabulum for organisms which gain access to wounds and so encourages the development of wound infections. Accordingly, although a wide variety of non-absorbable materials have been developed, such as Dacron, their use in some cases has been limited by the difficulty in knotting to maintain the requisite tension in the suture.

For example, surgeons, while recognizing the virtues of Dacron for sutures, have been deterred from using it more widely because of the tendency of the knots to become untied. When Dacron is used it is necessary to tie as many as six or seven knots and leave longer cut ends than are required with silk or cotton. It has been proposed that the drawback of using Dacron can be overcome by taking advantage of a minor but significant virtue of Dacron. Since Dacron melts at a temperature of 482° F., well below its flame point of 1,040° F., the cut ends can be sealed by a hot iron. The limitation of using a hot iron on any plastic suture is the danger of burning the patient, since it is necessary to bring the heat source into engagement with the knot of the suture. Toxic products are often produced from certain plastic materials that are harmful to the open wound. In addition the time-consuming problem of forming a knot is still present.

The present methods of suturing generally rely on the tying of knots which, as in the case of steel sutures, is extremely difficult and time-consuming. By eliminating the knot in all types of sutures we prevent the nidus for infection. We also minimize the foreign body reaction. Knots in general have a tendency to slip, particularly so in steel wire. In order to prevent this slippage the ends of the wire suture are buried in subcutaneous tissue. This hinders healing and causes post-operative pain to the patient. Furthermore the tension required to tie knots in steel is so great that surgeons run the risk of cutting their hands. This creates contamination of the operative field, not to mention a hazard to the surgeon.

Time saved in performing medical procedures is not only a savings in money but may result in saving life as well. During an operation tissues have to be sutured and blood vessels tied off and the longer this procedure takes with the patient under anaesthesia on the operating table, the greater are the risks for operative complications. Because one is able to efficiently and quickly form sutures the operating time for major surgery may be reduced.

OBJECTIVES OF THE INVENTION

It is the general object of the present invention to avoid and overcome the foregoing and other difficulties of, and objections to prior art practices by the provision of improved sutures and methods and apparatus for forming same with ultrasonic energy.

Another object of the present invention is to provide an improved method and apparatus for producing sutures for securing together layers of tissue in biological organisms, such as in humans.

Another object of the present invention is to provide an improved method of forming sutures to permit the use of a greater variety of thermoplastic and polymeric materials than heretofore possible for suturing.

Another object of the present invention is to provide an improved method for forming sutures so as to replace the "knots" or other restrictive members to prevent slippage and loosening of the suture.

Another object of the present invention is to provide a method and apparatus in which the tension applied by each suture to retain the sides of the wound in apposition to each other is uniform to prevent undercutting of the skin.

Another object of the present invention is the reduction in time required to form a suture as compared to prior practices. This is especially important in the tying off of numerous "bleeders" in all procedures.

Another object of the present invention is to provide a method of suturing which may easily be performed by a surgeon or other skilled person without any assistance.

Another object of the present invention is to provide a method of suturing which is less time-consuming than procedures practiced to date.

Another object of the present invention is to provide a method and apparatus which eliminates the tying of knots in forming sutures in a preset position.

Another object of the present invention is to provide a method of micro-suturing, as in ear operations, previously unattainable since it was hampered by lack of space for maneuvering the suture ends to form a knot.

Another object of the present invention is the formation of a suture that will not slacken due to the continued tension applied thereto.

Another object of the present invention is the formation of a suture that is made more compact than present sutures by the elimination of the knotted portion. This is important in organ approximations and transplants, etc., in preventing unwanted adhesions.

Another object of the present invention is the formation of a suture in which the knotted portion is welded together with ultrasonic energy to prevent any loosening thereof. This is important in all surgery, but becomes particularly crucial in attaching artificial life-saving devices to body tissue, as in valvular surgery.

Other objects of the present invention will become apparent as the disclosure proceeds.

SUMMARY OF THE INVENTION

In accordance with an aspect of the present invention, a suture of a thermoplastic material, which includes plastics and metals, is formed by threading or inserting subcutaneously through opposite sides of a wound a length of suture thread in a conventional manner, so that two free end portions in opposite sides of the wound are available for completing the suture with an intermediary portion extending therebetween below the surface. The free end portions are then pulled taut by tensioning to bring together the adjacent surfaces of the wound in apposition to each other. This applies an initial tension to the suture material and while maintaining this tension by either mechanical or manual means, respective segments of the free end portions are brought into overlapping relationship to each other to form a junction portion having an area of overlap. Ultrasonic vibrational mechanical energy is then introduced into the area of overlap in a proper direction and period of time to obtain a bond between the overlapping segments of suture thread.

The ultrasonic bonding is accomplished by using extremely minute elements or welding tips having a small area of contact, with a least one of the welding tips being resiliently supported so that the welding tips can be moved relatively toward each other, in a way similar to the prongs of a pair of tweezers, for suitably gripping the suture threads. Positioning means are preferably provided on one of the welding elements for accurately locating and retaining segments of the suture threads in overlapping relationship to each other and with respect to the welding tips.

The ultrasonic energy is introduced in a proper direction through at least one of the welding tips, which take the form of support and vibratory means, at a suitable frequency and amplitude to cause a joining or welding together of the lightly held suture segments of the end portions. The ultrasonic welding tips and instrument may be as disclosed in U. S. Pat. No. 3,053,120 by Balamuth et al., entitled Ultrasonic Welding.

A further feature of the invention resides in fusing the overlapping segments of the junction portion formed by a knot in a suture to prevent slippage when the tension forces are applied by the movement of the body. The respective free end portions immediately adjacent the knot may also be welded together to prevent slackening in the knot which results in a separation of the edges of the wound.

In accordance with another aspect of the invention the ultrasonic instruments may be adapted to apply ultrasonic vibrations in a plane normal to the area of overlap for joining polymeric natural and synthetic materials and in a plane parallel to the area of overlap for joining metallic suture materials. Combinations of vibratory motion such as elliptical and torsional may also be applied when required.

Another feature of the invention resides in the formation of a suture for retaining in apposition the edges of a wound, having an intermediary portion extending subcutaneously and connecting the adjacent sides of the wound with end portions integrally formed with the intermediary portion and extending through the tissue surface on opposite sides of the wound. A junction portion is formed by ultrasonically bonding overlapping segments of the respective end portions, after the suture thread has been stressed to bring the wound edges in apposition to each other so that the ultrasonically formed bond is capable of withstanding the stresses applied thereto and retain the sutured wound in the position set by the surgeon. The junction portion may be in the form of a knot with segments thereof welded together.

Alternately, the ultrasonic bonding can be applied for joining of the suture material edges at one surface of the wound, as in the case of sutures that are brought from one side of the wound to the other, then, without tying are continued back to the point of insertion and tied there to accomplish a particular type of approximation.

The intermediary portion of the suture may be brought around the walls of various vessel in the body, which requires a suture. For example, most suturing is done when a blood vessel is clamped to prevent bleeding. A suture is then applied around the clamped blood vessel, tightened and knotted. Much more suture material is used here (and time consumed) than in wound approximation. Many blood vessels are tied. This is where time is saved and security important.

Suturing to tie off remaining tissue after removal of pathological portions, and to approximate one portion of an organ to another, as in intestinal anastomosis, requires precision, speed and minimum trauma, all of which are interfered with by the clumsy process of tying square knots necessary for security.

Suturing to approximate an organ artificially implanted in a life threatening situation (kidney transplant) must be quick and secure.

Suturing to implant an artificial mechanical device to replace (either permanently or temporarily) a vital tissue or organ, as in introduction of Dacron heart valves, particularly requires a method of approximation where bonding is equally secure in the host and the material used.

The suture with a square knot, as diagrammatically illustrated, is the most common form of suturing. Variations for specific purposes and utilizing different techniques: mattress, Halsted, Gould, etc., all require the same ultimate approximation. Accordingly, the suture of the present invention may be utilized for any of the above suturing applications.

BRIEF DESCRIPTION OF THE DRAWINGS

It must be borne in mind that, for ease of illustration, the following drawings depict methods of surface skin closure, but the techniques are equally applicable to deep suturing, retention suturing and subcutaneous suturing.

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DISCUSSION OF THE DRAWINGS

The high frequency transducer means for practicing the method of the present invention may be either in the sonic or ultrasonic frequency range but for purposes of the present invention the word "ultrasonic" will be used to denote vibrations in the range of approximately 10,000 to 1,000,000 cycles per second.

The terms "suture thread" or "suture wire" which may be of a circular, rectangular or other cross-sectional area, are used interchangeably herein to include all thermoplastic materials, such as plastic, metal, catgut etc.

Figure 1:
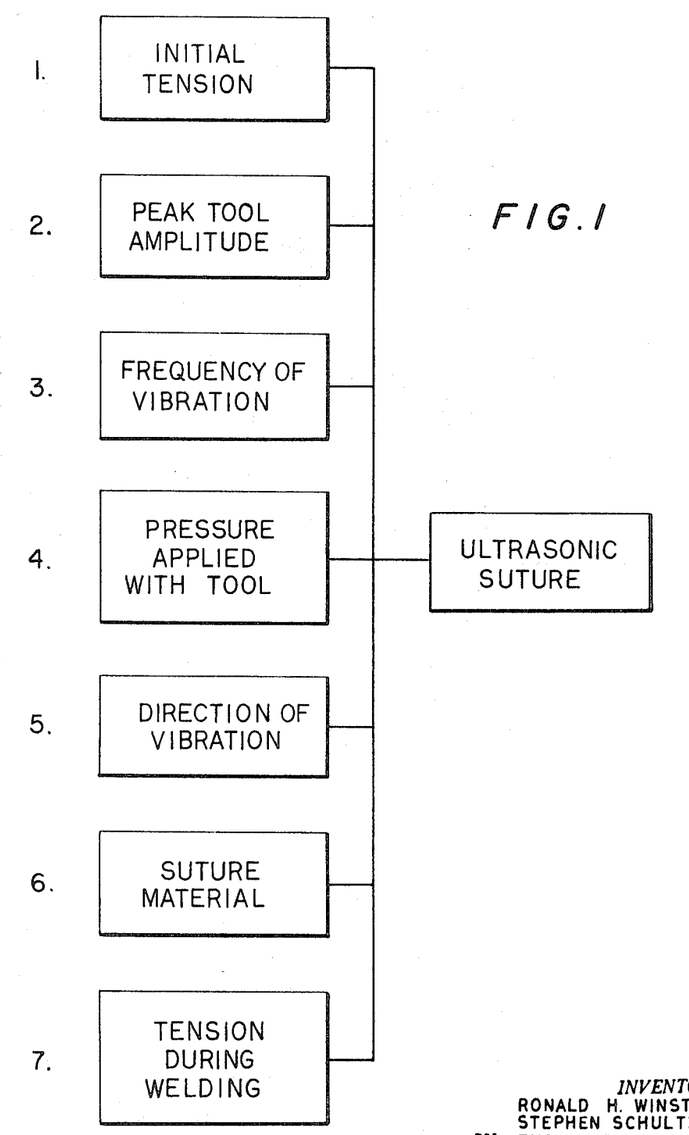
FIG. 1 is a chart indicating the relationship of the principal factors affecting the practicing of the present invention for the surgical procedure of forming sutures.

In performing the surgical procedure of suturing in accordance with the present invention, there are several factors that have to be taken into consideration and analyzed in terms of obtaining an effective suture to obtain the desired end results. Referring now to the drawings, FIG. 1 is a chart illustrating the relationship of the seven principal factors which are involved in whole or in part for determining the total value associated with forming sutures in vivo in a biological organism.

1. Initial tension applied to bring the spaced apart segments of the wound in apposition to each other.
2. Peak tool amplitude.
3. Frequency of vibration.
4. Pressure applied with tool to suture material.
5. Direction of applied vibration.
6. Suture material.
7. Continuing tension during welding. These factors vary with respect to the material being used and type of suture being formed.

Figures 2, 2A, 2B, 2C, 2D:
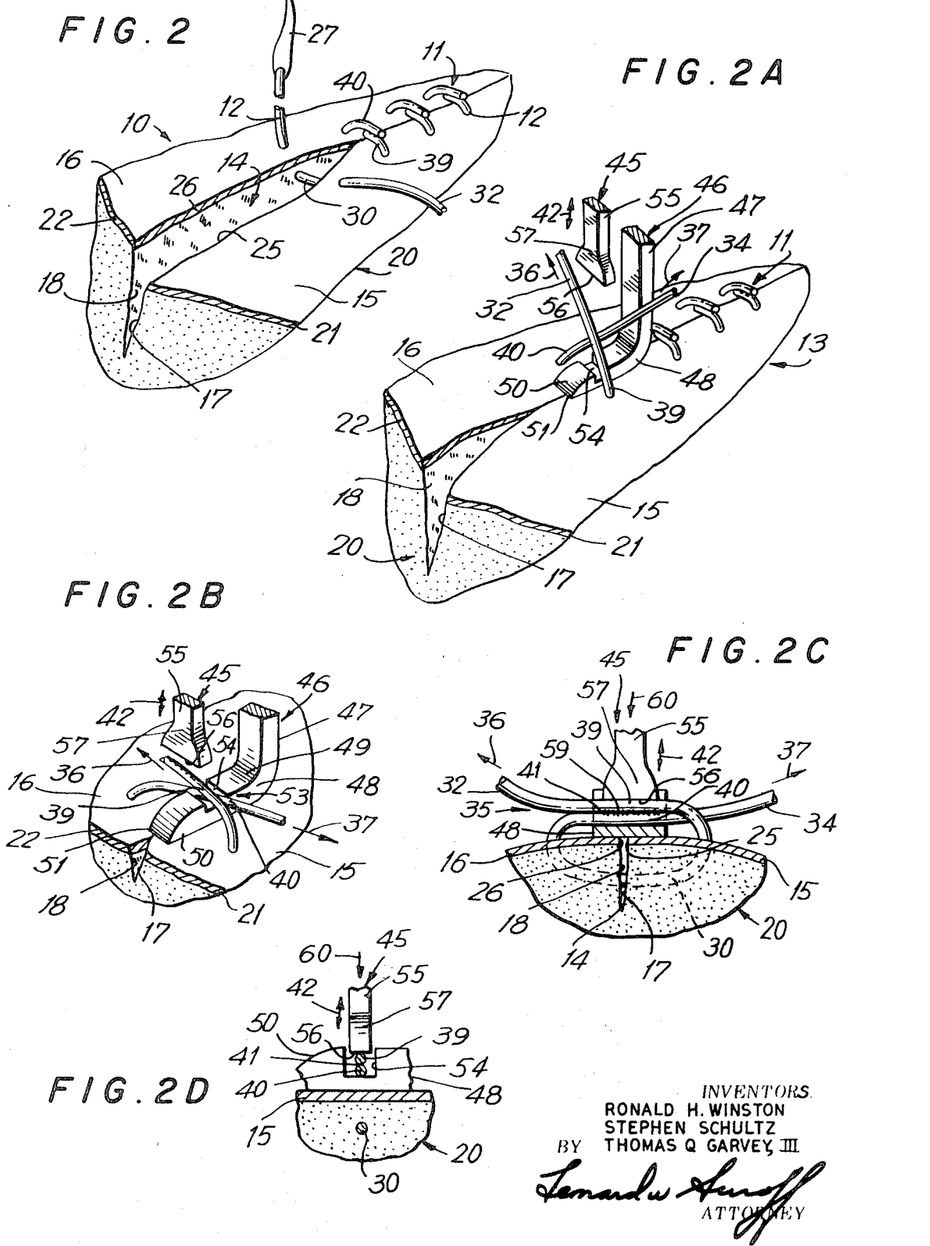
FIG. 2 is an enlarged fragmentary perspective view of a portion of a biological organism diagrammatically illustrating the initial aspect of forming a suture in accordance with the present invention.
FIGS. 2A and 2B illustrate in a manner similar to FIG. 2, the next sequential steps of tensioning the free end portions of the suture thread to bring the wound edges in apposition to each other and segments of the free end portions in overlapping relationship for forming a junction.
FIGS. 2C and 2D are front and side views respectively, partially in cross-section, illustrating the formation of the junction portion of the suture with the resulting bond between the overlapping segments.

Referring again to the drawings, and with respect to FIGS. 2–2D inclusive, the invention 10 illustrates the formation of a suture 11 from a suture thread 12 in accordance with the invention and in which a biological organism 13, such as a human, has an open wound 14, extending from the adjacent surface 15 and 16 with spaced apart side walls 17 and 18, on a portion 20 of the anatomy that is to be sutured together. A layer of skin 21 and 22 is respectively situated on each side of the wound 14. In order to bring together the respective opposite edges or walls 25 and 26 contained at the marginal portions of sidewalls 17 and 18 respectively, a series of sutures 11 are to be formed along the adjacent or adjoining surfaces 15 and 16 respectively. Initially the surgeon, or any other skilled person, inserts the threaded needle 27 through one of the respective adjacent surfaces, such as at 15 through the sidewalls 16 and 17 respectively, and then through the opposite adjacent surface 16 to the position seen in FIG. 2. This may be done by an automatic device or manually. This produces essentially an intermediary suture portion 30 extending subcutaneously and connecting the adjacent sides 17 and 18 of the wound 14 with free end portions 32 and 34 integrally formed with the intermediary portion 30 and extending through the tissue surface 15 and 16 on the opposite sides of the wound 14.

An initial tension is produced in the suture thread 11 by applying a force to one or both the free end portions 32 and 34 in the general direction of arrows 36 and 37 respectively, so that the adjacent walls 15 and 16 are brought into apposition with each other as seen in FIGS. 2A and 2B. The tension applied is related to the area of the body in which the suture is formed as well as the composition of the suture thread. In order to obtain a proper healing, it is important that when the formation of the suture is completed, the adjacent edges 25 and 26 are in close proximity to each other if not in physical contact. Accordingly, this initial tension may be applied by the surgeon or his assistant as by gripping the free ends 32 and 34 and applying the requisite force, which in turn stresses the suture thread 11 and then maintaining said applied force in the proper direction as the suture wire 11 is brought into position for joining segments of the free end portions 39 and 40 by means of ultrasonic energy.

As indicated by the arrows 36 and 37 the static force is applied in a direction such that the free ends 32 and 34 of the suture thread 11 cross over each other and the segments 39 and 40 thereof are brought into overlapping relationship to each other to form an area of overlap 41, seen in FIGS. 2C and 2D, at which interface the end portions 32 and 34 are ultrasonically joined together.

Essentially up to this stage the steps of suturing, in accordance with the present invention, are essentially the same for suture materials of either a plastic or metallic material. For plastic suture materials, as illustrated in FIGS. 2 through 6B, the high frequency mechanical vibrations are applied in a plane substantially normal to the overlapping area of the suture segments being bonded or sealed, as illustrated by the direction of arrow 42, in accordance with the art of sealing plastic materials, which is well known in the art.

In contrast to this for welding metallic suture threads, as illustrated in FIGS. 1 through 11, the high frequency mechanical vibrations are applied in a plane substantially parallel to the area of overlap in accordance with the well known theory of welding metallic elements.

FIGS. 2C and 2D illustrate the completion of the formation of suture 11 by the use of vibratory means 45 and support means 46 which may be separate instruments operated by the same or different individuals or part of a unitary ultrasonic system adapted for performing ultrasonic suturing.

The support means 46 has a leg portion 47, terminating in a lower extension 48 in the form of a support arm at substantially right angles to the leg portion 47, with a support surface 49 that is used to engage the overlapping segments of suture thread to be joined together. The support arm has a forward toe portion 50 that is tapered substantially to a narrow edge 51 to facilitate the ease in which it may be both positioned in place and removed after the suture 11 is formed, without applying additional stresses thereto.

The support means 46 includes positioning or jig means 53, on the support surface 49 for accurately locating the suture segments 39 and 40, with respect to each other and with respect to the support means 46 and vibratory means 45. The spaced apart work member and support member are also referred to herein as welding tips. Accordingly a transverse groove or slot 54 is provided on the support surface 49, which provides a seat in which the ends of the suture thread to be welded may extend. The groove 54 conveniently constitutes a jig for locating the segments 39 and 40 of the suture thread with respect to each other and also with respect to the vibrated welding tool member 55, which has a working surface 56 of a small area for contact with at least one of the overlapping segments at a point where a weld is obtained at the area of overlap 41.

The front end of the tool member has an enlarged portion 57, shaped to have a width slightly less than the width of the groove 54 so as to facilitate its movement within the groove 54. As illustrated the transverse dimension of the working surface 56 is less than the groove 54, this may vary depending upon the total area to be joined together.

The depth of the groove 54 is generally less than the thickness of both suture segments positioned therein in overlapping relationship to each other. For example, if the diameter of the suture thread is 0.010 inch then the depth of the groove should not exceed 0.020 inch. This permits the working surface 56 to engage and compress the overlapping segments 39 and 40 of suture material. If desired the groove may be provided on both members or the tool member alone. Experience has shown that it is preferable to provide the positioning means on the non-vibrating member since it is easier to position and retain the thread portions therein until the work member 55 is brought into sealing engagement with the support member 46. If desired the support means may simultaneously be vibrated in phase or one half wavelength out of phase with the tool member.

In practice the needle 27 with the suture thread 12 secured thereto is threaded through the adjacent surfaces 15 and 16 of the wound 14 to obtain the intermediary portion 30 below the tissue surfaces of the wound, with respective end portions 32 and 34 integrally formed with the intermediary portion 30 and extending respectively through the surfaces 15 and 16 on opposite sides of the edges 25 and 26 thereof. The suture material 12 is then tensioned by manually or mechanically gripping one or both of the end portions 32 and 34 to bring the adjacent edges 25 and 26, and in turn wound walls 17 and 18 in apposition to each other. While maintaining said tension, which is indicated by the force arrows 36 and 37, respective segments 39 and 40 are placed within the positioning means 53 in overlapping or adjoining relationship to each other in a manner to form a junction portion 35 having an area of overlap 41. The overlapping segments 39 and 40 of suturing thread are retained in a fixed position in which the free end portions have been stressed to bring the wound walls 17 and 18 in apposition to each other. High frequency mechanical vibrational energy is introduced into the area of overlap 41 by bringing the output surface 56 of the member 55 into physical engagement with the segment 39 by the application of a static force in the direction of arrow 60 and continuing the application during a period of time sufficiently long to permit the joining of said overlapping segments of suturing thread to form the bond or weld 59, as illustrated in FIG. 2C, of the completed suture 11.

The formed suture 11, of the invention, will retain in apposition the edges 25 and 26 of the wound 14, having an intermediary portion 30 extending subcutaneously and connecting the adjacent side walls 17 and 18 with the end portions 32 and 34 extending respectively from each end of the intermediary portion 30 and through the tissue surfaces 15 and 16 on opposite sides of the wound 14. A junction portion 35 is formed by ultrasonically bonding overlapping segments 39 and 40 of the end portions 32 and 34 respectively, after the end portions 32 and 34 have been stressed or tensioned to bring the wound edges 25 and 26 in apposition to each other so that the ultrasonically formed bond is capable of withstanding the stresses applied thereto and retain the sutured wound in the position set by the surgeon.

The frequency of vibration is generally within the range of 10,000 to 100,000 cycles per second and preferably in the range of 20,000 to 40,000 cycles per second. The amplitude of vibration is generally in the range of 0.0005 to 0.005 inches, depending on the ultrasonic system employed.

Figure 2E:
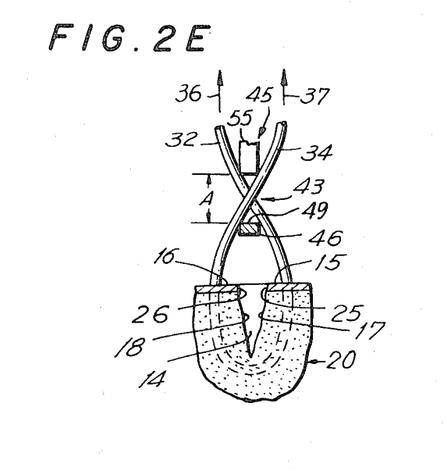
FIGS. 2E and 2F illustrate one method of forming the suture in FIG. 2C.
Figure 2F:
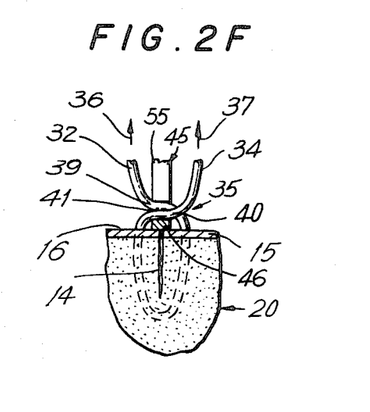

The suture 11, formed in FIGS. 2–2D, is ideal for wounds in which the space available is not limited, so that the necessary space to tension the free end portions until segments thereof are brought into overlapping engagement for bonding is present. Since a knot is not required, a variety of variations in techniques are possible with the present invention. Accordingly as illustrated in FIGS. 2E and 2F the free end portions 32 and 34 may be maintained in a plane substantially normal to the tissue surfaces 15 and 16 but with a cross-over portion or junction 43 that will form the junction portion 35 between the end portions. This is initially accomplished by supporting the free end portions in a plane substantially normal to the adjacent surfaces 15 and 16 by the application of respective tension forces indicated by arrows 36 and 37 in a substantially vertical plane or normal to the surfaces, as compared to the substantially horizontal plane illustrated in FIG. 2C. By applying the forces in a substantially vertical plane the cross-over of the end portions 43 is formed in spaced relationship to and in the order of anywhere from approximately 0.5 to 2.0 inches from the surface portions 15 and 16.

The advantage is that sutures may now be formed in a small working area, as in micro-surgery in the ear, or in tying off bleeders, etc., where sufficient space just does not exist. In this manner the support means 46 and vibratory means 45 are positioned on opposite sides of the cross-over junction and maintained in fixed spaced relationship to each other, which spacing may be in the order of approximately 0.015 to 0.125 inches. Thus, the tool member 55 engages the cross-over portion 43 at one side thereof remote from said surfaces. While maintaining the spacing between the vibratory means 45 and support means 46, and simultaneously retaining the free end portions 32 and 34 relatively fixed, the support means 46 and vibratory means 45 are progressively moved in unison relative to the tissue surfaces 15 and 16 until the overlapping segments 39 and 49 reach the position shown substantially as illustrated in FIG. 2F and form the junction portion 35, except that the free end portions 32 and 34 extend substantially vertically. This avoids any lateral movement and possible disengagement with the tool member.

After reaching the position shown in FIG. 2E, the vibratory means 45 and support means 46 are moved relative to each other such that the junction portion 35 is formed by application of a small compressive force in a plane substantially normal to the engaged segments in the area of overlap 41. While this compressive force is maintained, the working surface of the tool member 55 is vibrated at an ultrasonic rate to apply an additional energy producing force at the engaged surface. The compressive and energy producing forces are continued until the layers of suture thread are secured together by the combined action of these forces.

The force required to bring the adjacent edges 25 and 26 in apposition to each other may be obtained by pulling the free end portions prior to positioning same between the tool member 55 and support surface 49, or as these surfaces are moved relative to the body portion 20 being sutured. This latter way is obtained by retaining the end portions in a relatively fixed position as said tool member 55 is moved relative to the body portion 20, so as to apply a tension force thereto to bring the adjacent wound edges in apposition to each other. If desired, the tool member 55 may retain the cross-over portion 43 in position alone and then the support means slipped thereunder prior to the application of the ultrasonic energy.

In the sutures formed as discussed above the junction portion extends in a plane substantially parallel to the surfaces of the body portion being sutured. In contrast to this it might be desirable for space limitations as to the junction portion itself, to produce a suture 11a as illustrated in FIGS. 3 and 3A having an intermediary portion 30a with the free end portions 32a and 34a extending from both ends thereof and terminating in a junction portion 35a, extending in a plane substantially normal to the surface of the body portion 20a.

Figure 3:
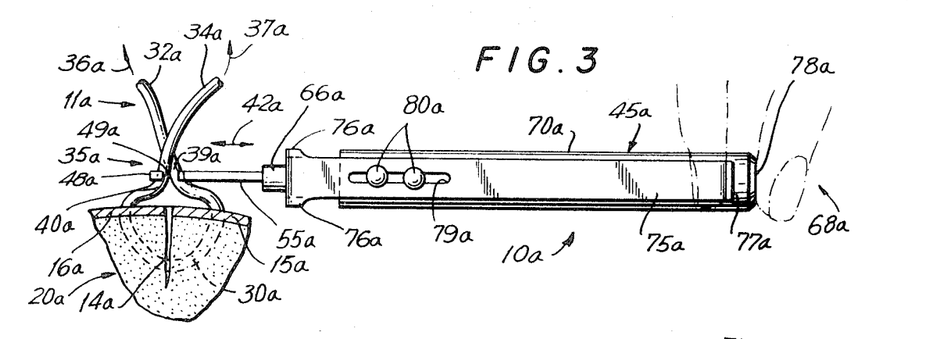
FIG. 3 is a top longitudinal view of one form of ultrasonic system, of the type capable of being hand held and manipulated, for forming sutures in accordance with the invention.
Figure 3A:
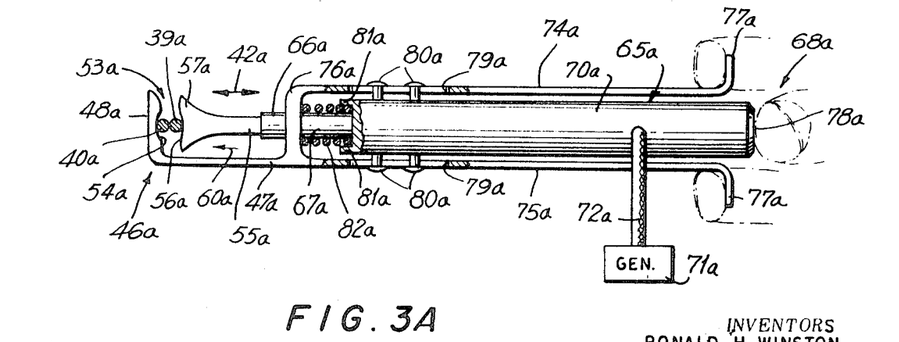
FIG. 3A is a side longitudinal view, partly in cross-section, of the ultrasonic system of FIG. 3.

FIGS. 3 and 3A also illustrate one form 10a of the ultrasonic system for joining together in vivo, overlapping segments of suture threads to form the suture 11a. The system includes vibrator means 45a in the form of a hand held instrument, including an ultrasonic transducer or motor 65a for effecting the high frequency vibrations of the tool member 55a, having an enlarged portion 57a terminating in a working surface 56a that extends in a plane substantially normal to the direction of mechanical vibrations illustrated by the arrow 42a. The base 66a of the tool member 55a is secured to an insert portion 67a. The support means 46a is provided to act as an anvil or clamp, so that the overlapping layers of suture thread 39a and 40a of end portions 32a and 34a respectively, may be compressed between the working surface 56a and a support surface 49a provided on said vibratory and support means.

The ultrasonic motor 65a, as illustrated, may be in the form of a driving member adapted for being hand held as by an operator 68a, and generally comprising a tubular housing or casing 70a into which the insert unit 67a supporting the tool member 55a may be partially telescoped. The ultrasonic motor 65a is energized by an oscillation generator 71a, with a power cable 72a, connecting the two together. The generator is an oscillator adapted to produce electrical energy having an ultrasonic frequency.

The ultrasonic motor 65a may be one of a variety of electromechanical types, such as electrodynamic, piezoelectric and magnetostrictive. The ultrasonic motor 65a for effecting surgical procedures through hand directed tools of suitable configuration, which are readily replaceable or inter-changeable with other work performing tools in acoustically vibrated material treating devices, may be of the type disclosed in U.S. Pat. Nos. Re. 25,033, 3,075,288, 3,076,904 and 3,213,537, and wherein each work tool member is rigidly joined, in end-to-end relationship to a connecting body or acoustic impedance transformer and to a transducer which may form an insert unit or assembly which is removable supported in a housing, containing a coil in surrounding relationship to the transducer and receiving alternating current for producing an alternating electromagnetic field.

The transducer in the ultrasonic motor 65a is longitudinally dimensioned so as to have lengths which are whole multiples of half-wavelengths of the compressional waves established therein at the frequency of the biassed alternating current supplied so that longitudinal loops of motion as indicated by arrow 42a, occur both at the end of the insert unit 67a to which the tool member 55a is rigidly connected and the working surface 56a. Thus, the optimum amplitude of longitudinal vibration and hyper-accelerations of tool member 55a is achieved, and such amplitude is determined by the relationship of the masses of the tool member 35a and insert unit 67a which may be made effective to either magnify or reduce the amplitude of the vibrations received from the transducer.

The tool member 55a may be permanently attached to the end of insert unit 67a, for example, by brazing, soldering or the like, or the tool may be provided with a threaded stud (not shown) adapted to be screwed into a tapped hole in the end of insert unit 67a for effecting the rigid connection of the tool to the stem.

The support means 46a and the vibratory means 45a may be separate instruments and utilized by one or more surgeons simultaneously, but yet individually. For convenience they may be combined in one hand held instrument, for example, as disclosed in U.S. Pat. No. 3,053,124 referred to above, which is designed primarily for metals but might be modified for plastics.

If preferred the hand held instrument disclosed in FIGS. 3 and 3A may be employed and in which the support means 46a is part of the instrument and includes a pair of legs 74a and 75a respectively, secured together at their lower end by bands 76a and provided with finger gripping means in the form of individual lugs 77a that extend outwardly from the upper end of the legs for engagement by the fingers of the surgeon or operator 68a in a manner hereinafter described. The leg 75a has a leg extension 47a that terminates in a lower extension or support arm 48a substantially right angle to the leg extension 47a, and is provided with the support surface 49a in spaced relation to the working surface 56a of the tool member 55a. The support surface contains the positioning means 53a in the form of a groove 54a.

The legs 74a and 75a are in spaced relation to each other and may be contoured to conform to the cylindrical configuration of the ultrasonic transducer housing 70a. The generator 71a is connected to the transducer 65a by means of the cable 72a in a conventional manner. As seen in FIG. 3 the cable 72a may enter the ultrasonic motor 65a from the side so as to leave the rear end 78a free for engagement by the thumb or any other finger of the surgeon to permit manual control of the relative displacement between the overlapping working and support surfaces.

The support means 46a is mounted for relative movement, with respect to the ultrasonic motor by providing a pair of slots 79a on each of the legs 74a and 75a, and which slots accept headed fasteners 80a which extend from the casing 70a through the slots 79a to permit free relative movement between the ultrasonic motor 65a and support means 46a. The lower end of the casing 70a is provided with an annular shoulder 81a which is adapted to receive spring means in the form of a spring 82a, which is contained within the shoulder 81a at the opposite end thereof. The spring 82a applies a force in the direction of arrow 60a, so that the working surfaces of the support means and ultrasonic motor means are biassed away from each other, whereby the force applied by the surgeon is required to bring the overlapping working and support surfaces together. If desired the spring may be coupled to the support and ultrasonic motor means so as to force them together with a predetermined static force which might be varied in a conventional manner not shown. In this manner once the static force is determined for the particular thickness of the suture thread segments 39a and 40a, the resultant permanent or temporary seal may be obtained.

Accordingly the spring means may yieldably urge the support means 46a and transducer means 65a relative to each other to a position wherein the working and support surfaces 56a and 49a, respectively, are normally in engagement with each other under a predetermined static force, so that the support and transducer means are first separated for the placement of the overlapping portions of suture threads 32a and 34a therebetween. In contrast to this the spring means may be adjusted such that the working and support surfaces are normally maintained in spacially fixed relation to each other, so that the suture segments to be joined 39a and 40a are positioned between the surfaces which are brought together by the operation of the hand held instrument.

In accordance with the invention the joining of the suture thread may be of a permanent or semi-permanent nature, and this is accomplished by properly selecting the frequency, amplitude of ultrasonic mechanical vibrations, and area of bond, to produce an optimum bonding of the thermoplastic material in the overlapping portions of suture thread. Since the tension applied to the suture 11a will vary with respect to the position of the suture within the body, the strength of the weld may vary accordingly by controlling the variables. There are those suture wounds where it might be desirable to actually have the suture release the tension applied to the wound after say 1 or 2 weeks after the suture was formed. In accordance with the present invention this may be accomplished.

Figures 4, 5:
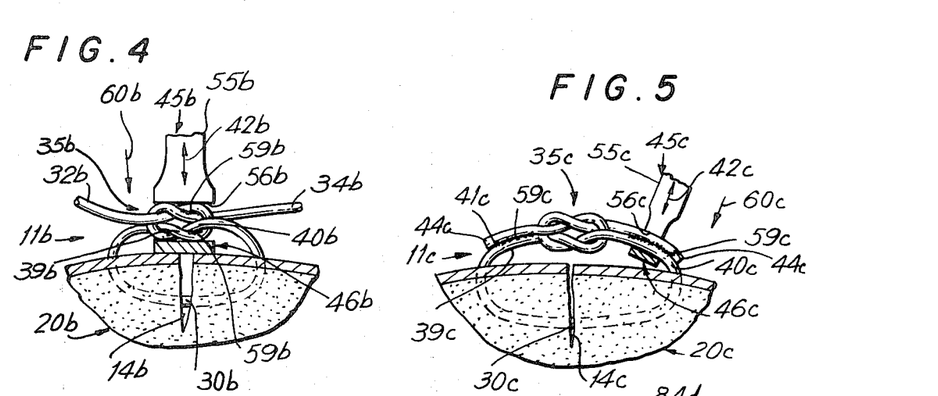
FIG. 4 is an enlarged view illustrating the formation of a suture in which segments of the junction portion, which is in the form of a knot, are ultrasonically welded together.
FIG. 5 is an enlarged view similar to FIG. 4, in which the overlapping segments of the junction portion, ultrasonically welded together, are adjacent to the knot.

As illustrated in FIG. 4 the suture 11b may be formed in which the junction portion 35b is in the form of a conventional knot portion adapted to initially retain the wound 14b in its preset or closed position in the body portion 20b. For certain types of wounds the knot is not as objectionable and can be tolerated and accordingly may be incorporated in the ultrasonically formed suture. Thus, it may be desirable to first form a knot portion in any conventional manner and thereafter ultrasonically join together the overlapping segments 39b and 40b of the respective end portions 32b and 40b which are integrally formed with the intermediary portion 30b, at the same time the knot may be compressed to reduce its size and eliminate certain objections thereto.

This is accomplished by positioning the support means 46b beneath the junction knot portion 35b and bringing the tool member 55b of the vibratory means 45b into engagement with the opposite side thereof until the knot is sufficiently compressed, by the force indicated by arrow 60b, to be assured of an area of overlap 41b between the respective segments 39b and 40b. Since the suture thread is illustrated as plastic material in FIG. 4, although it could be metallic, the high frequency mechanical vibrations are transmitted through the tool working surface 56b to the knot in a plane substantially normal to the area of overlap, as indicated by arrow 42b, for a period of time necessary to obtain the bonding together of the segments and form the bond 59b.

Once the ultrasonic bond is formed, the junction portion becomes integral so that possible slackening of the knot and in turn loosening of the suture is eliminated. This type of ultrasonic suture is desirable in those instances where knots are not that undesirable and the important feature being the prevention of the suture from becoming loosened. The required forces for the compression of plastic materials may be selected in order to compress and thus reduce the size of the knot portion, which is another advantage of this type of suture.

As compared to the hot iron technique for fusing plastic knots as hereinabove discussed, ultrasonic welding is accomplished at a relatively cool temperature. Accordingly, the support means 46b or even the vibratory means 45b may be placed in engagement with the biological organism 20b without causing any damage thereto. This is not possible with a hot iron in which any slip of the iron, which could easily occur, would burn the tissue it engages. Obviously the heated iron does not lend itself for a safe and efficient approach.

FIG. 5 illustrates another form of the invention in which a suture 11c is formed in somewhat similar manner as to FIG. 4, except that terminal end portions 44c, respectively, are bonded to segments 39c and 40c respectively, of the junction portion 35c as formed by the knot. The bond is formed by supporting each of the overlapping segments 44c and 39c, and 44c and 40c, in overlapping engagement between the support means 46c and vibratory tool means 45c and applying the vibrations in the direction of arrow 42c by the tool member 55c, which is in a plane substantially normal to the area of overlap 41c to form the bond 49c.

This form of suture 11c is convenient to form and may be completed prior to the free end portions (not shown) being cut off in a conventional manner from the knot, or as illustrated in FIG. 5, the free end is cut off and the terminal portion 44c remains to be ultrasonically joined to form an integral junction portion. It is contemplated that sutures will be formed having a bonded portion in the knot per se, and the ends thereof as illustrated in FIG. 5.

Figure 6:
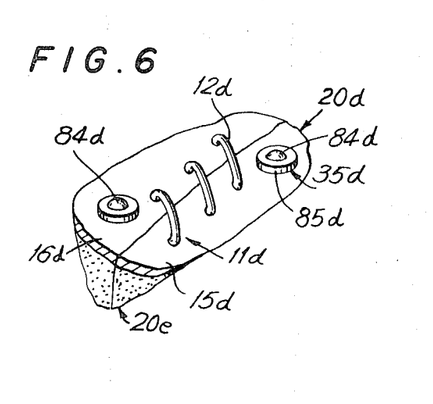
FIG. 6 is an enlarged fragmentary perspective view of a portion of a biological organism, diagrammatically illustrating a loop suture secured at each free end portion to retain the wound in a closed position.
Figure 6A:
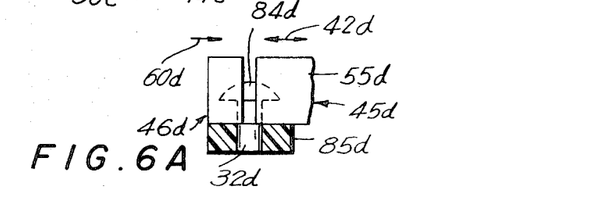
FIG. 6A is a side view, partially in section, illustrating the formation of a headed junction portion on the suture thread.
Figure 6B:
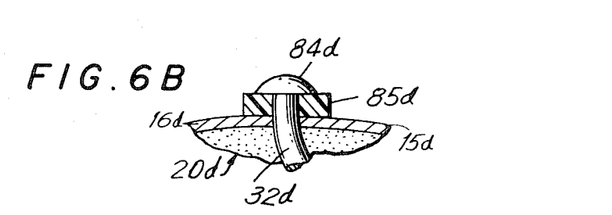
FIG. 6B is an enlarged cross-sectional view through the headed and fastener portions of the suture illustrated in FIG. 6.

FIGS. 6–6B illustrate the formation of a suture 11d in which the suture thread 12d is continually looped to connect the adjacent surfaces 15d and 16d so that only the respective ends thereof have a separate junction portion 35d which retains the wound in a preset position by the fastener 85d, positioned at each end with a headed portion 84d formed thereat. As seen in FIG. 6B the end portion 32d has the fastener 85d positioned thereon and the head portion 84d formed by the tool member 55d, vibrated in the direction of arrow 42d and having a contour therein with a complementary contour on the support means 46d. The support means 46d and vibratory means 45d are moved relative to each other in the direction of arrow 60d, until the head is formed. The head portion may be initially formed at one end of the suture 11d and the head or junction portion may be formed at the opposite end when the suture is complete.

Figure 7:
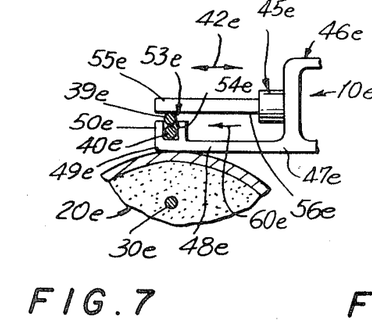
FIG. 7 is a fragmentary side view illustrating the use of the ultrasonic system of FIGS. 3 and 3A, slightly modified for ultrasonically welding suture thread of metallic material.
Figure 7A:
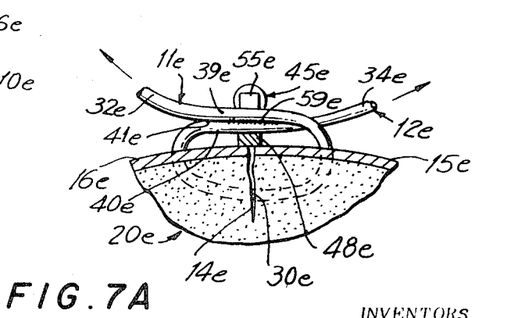
FIG. 7A is an end view, partly in cross-section, of the system of FIG. 7.

FIGS. 7 and 7A illustrate the invention 10e as applied to the formation of a suture 11e of a suture thread 12e of a metallic material in which the ultrasonic mechanical vibrations are applied in the direction of arrow 42e, which is in a plane substantially parallel to the area of overlap 41e to form the bond or weld 59e between the respective overlapping segment 39e and 40e of the end portions 32e and 34e. The other steps in forming the suture 11e to close the wound 14e are similar as hereinabove discussed.

The support means 46e is modified, as compared to the system illustrated in FIGS. 3 and 3A, to the extent that the leg portion 47e contains the lower extension 48e with the toe portion 50e containing positioning means 53e in the form of a slot 54e which acts in the same manner as discussed with respect to FIGS. 2–2D. The slot acts as the support surface and permits the positioning and retension of the segments 32e and 34e therein with the upper segment extending either above the toe portion 50e or an additional slot may be provided to permit the working surface 56e of the tool member 55e to engage segment 32e. In this manner suture materials of metallic material may be welded using the same range of frequency and amplitude of vibration. The static force is applied by designing the spacing between the tool surface 56e and the contacted portion 39e, so that a slight interference is obtained when the support means is moved relative to the vibratory means as illustrated by the arrow 60e.

Figure 8:
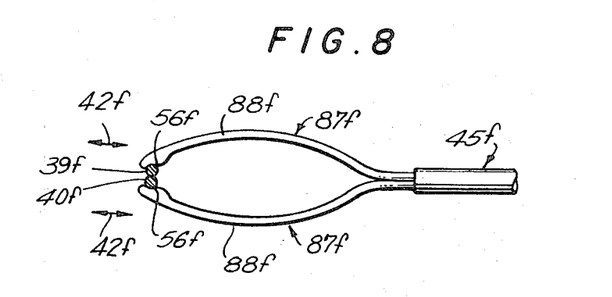
FIG. 8 is a fragmentary elevational view of a welding tip for joining sutures of metallic materials.

FIG. 8 shows that the vibratory energy may be transmitted by the vibratory and support means simultaneously by the use of a pair of tweezers 87f, being formed of resilient prongs 88f arranged symmetrically with respect to the longitudinal axis of the vibratory means 45f to which the tweezers 87f are mechanically secured. This technique of welding is disclosed in the above referred to U.S. Pat. No. 3,053,124. A small area of contact provide the welding tips and a gap is normally present to position the suture segments 39f and 40f therein for engagement with the working surfaces 56f of the tweezer. Vibratory energy may be applied in the direction of arrows 42f when the suture segments 39f and 40f are held by the welding tips of the prongs when the latter are pressed either manually or otherwise, toward each other.

Figures 9, 10:
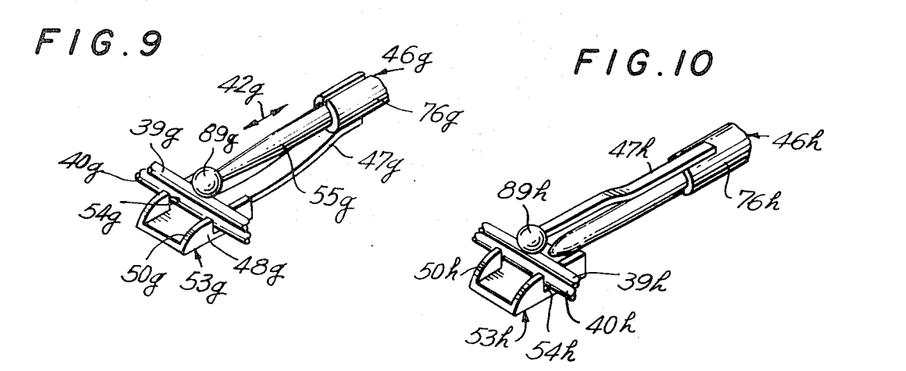
FIG. 9 is an enlarged fragmentary perspective view of a portion of an ultrasonic unit in which the support means is movable relative to the vibratory means and the support means contains positioning means thereon.
FIG. 10 is an enlarged fragmentary perspective view, similar to FIG. 9 but showing a different arrangement of the support and vibratory means.

FIGS. 9 and 10 illustrate welding apparatus as illustrated in the above referred to U.S. Pat. No. 3,053,124 for joining metallic suture materials. In accordance with FIG. 9 the support means 46g includes a resilient leg portion 47g, secured to the band 76g at one end thereof and having a lower extension 48g with a toe portion 50g. The positioning means 53g is contained on the upright wall portions of the toe portion 50g is in the form of a slot or groove 54g. The tool member or welding tip 55g is provided with a small diameter metallic sphere 89g which is adapted to engage segment 39g as the latter is retained in overlapping relationship to the segment 40g. The tool member 55g is vibrated in the direction of arrow 42g which is in a plane substantially parallel to the area of overlap formed. As the energy is applied, the extension leg 48g, which is resilient may be pressed toward the sphere 89f to apply the necessary static force between the overlapping segments.

FIG. 10 is similar to FIG. 9 except that the welding tip is resiliently mounted as by placing the sphere 89h on the end of the lower extension 47h which is connected to the band 76h of the support means 46h. The tool member contains the positioning means 53h having a toe portion 50h with a slot 54h to retain the overlapping segments 39h and 40h in place. In this manner the segments can be inserted within the slot 54h with the compressive force applied by the sphere 84h and then the energy transmitted thereto.

Figure 11:
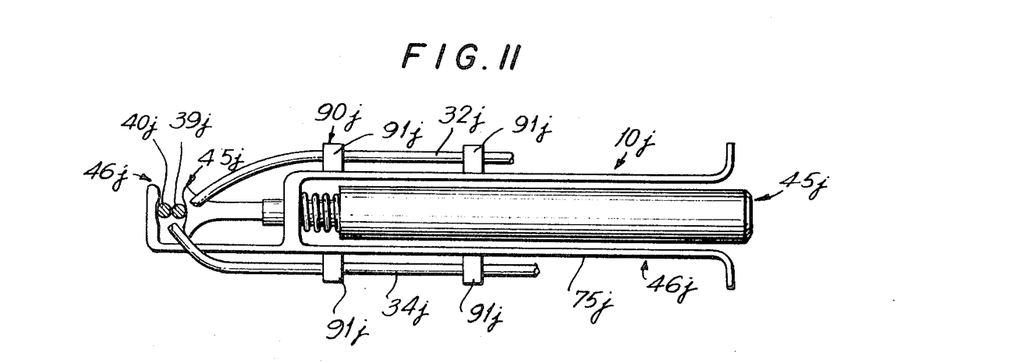
FIG. 11 is a fragmentary view similar to FIG. 3, but showing tension means associated with the housing.

FIG. 11 illustrates the ultrasonic system 10j, discussed with reference to FIGS. 3 and 3A, except that tension means 90j which may be mounted in any conventional manner on the support means 46j, has been added. The tension means 90j is intended to include any device capable of holding the free end portions 32j and 34j in a fixed position relative to the vibratory means 45j so as to apply the requisite tension and in turn compression of the overlapping segments 39j and 40j as they are positioned between the support means 46j and tool member 55j. As illustrated a pair of clips 71j are mounted on each leg 74j and 75j to provide the necessary tension to prevent any relative movement between the tension means and the support means. This tensioning as such may be applied mechanically by the mechanism illustrated or by the surgeon.

In suturing of vessels in the biological organism, such as blood vessels, the adjacent surfaces form the walls of the vessel and the suture is applied to tie off said vessel. When the suture thread is tensioned, the adjacent surfaces of the blood vessel are brought into substantial engagement with each other and the intermediary portion of the suture encircles the vessel. The junction portion is then formed in the various manners hereinabove explained.

CONCLUSION

Applicants' have herein disclosed new and novel methods and apparatus for forming sutures as well as new and novel sutures, having characteristics never obtainable with known techniques, which techniques have remained almost the same for hundreds of years whereas other areas of surgical procedures have moved progressively ahead. A suture is a most important aspect of any operation, and applicants' invention permit the use of an untold number of materials which to date have been found unsuitable for suturing. More important, the door is now open for industry to develop new materials bondable with ultrasonic energy and highly suitable for suturing. Although this invention has been discussed primarily with reference to suturing biological organisms, such as humans, it is to be particularly understood that the invention is not limited thereto or thereby. This process may be used wherever suturing of materials is employed for temporary or permanent joining of materials in industry in general.

While the invention has been described in connection with particular ultrasonic motor and tool member constructions, various other sutures, devices and methods of practicing the invention will occur to those skilled in the art. Therefore, it is not desired that the invention be limited to the specific details illustrated and described and it is intended by the appended claims to cover all modifications which fall within the spirit and scope of the invention.

I claim:

1. Apparatus for forming a suture of a plastic material comprising:
   A. support means having a surface for positioning overlapping segments of the suture thereon, said support means having a groove forming said surface for positioning the overlapping segments therein,
   B. a tool member having a working surface for contact with said overlapping segments, said working surface is adapted to fit within said groove,
   C. means for mounting said support means in a manner to permit displacement of said working and support surface relative to each other for engagement with opposite sides of the overlapping segments for applying a compressive force thereto, said means for mounting said support means includes
      a. a pair of legs extending in surrounding relation to said transducer means,
      b. means securing said legs together,
      c. means coupling said support means to one of said legs at one end thereof below said tool member,
      d. means mounting said transducer means relative to said legs to permit axial movement relative thereto, said means mounting said transducer means to one of said legs includes
         1. a slot on said legs, and
         2. a headed fastener extending from said transducer means and through said legs to provide the axial alignment therebetween, and
      e. spring means extending between said transducer means and said legs to provide a static force to assist in said suture forming,
   D. gripping means for manually controlling the relative displacement of said support means and said tool member, said gripping means extending from said legs, and
   E. transducer means operative to vibrate said working surface of the tool member at a high frequency of at least 10,000 cycles per second, and said vibrations are applied in a direction substantially parallel to the direction in which the vibration is applied to said overlapping segments, wherein an ultrasonic junction portion is formed capable of withstanding the stresses applied thereto and retain said adjacent surfaces of the suture in a preset position.

2. Apparatus as claimed in claim 1, wherein the depth of said groove is less than the thickness of the suture segments positioned therein in overlapping relationship.

3. Apparatus as claimed in claim 1, wherein said support means has a tapered front portion to facilitate placement below the suture.

4. Apparatus as claimed in claim 1, and further including tension means to retain said suture in a fixed position relative to said support means, wherein as said transducer means is moved relative to said support means a tension is applied to the suture to bring the adjacent surfaces into a set position and said overlapping segments of the suture are joined together by the combined action of the applied compressive force and ultrasonic vibrations.

5. A hand held instrument for joining together overlapping segments of a plastic suture thread to form a suture, comprising:
   A. support means having a surface for positioning the overlapping segments thereon, said support means has a groove forming said surface for positioning the overlapping segments therein,
   B. restraining means in communication with said support surface for retention of said overlapping segments in said overlapping relationship,
   C. a tool member having a working surface for contact with said overlapping segments, said working surface is adapted to fit said groove,
   D. transducer means operative to vibrate said working surface of the tool member at a high frequency of at least 10,000 cycles per second, said vibrations are applied in a direction substantially parallel to the direction in which the compressive force is applied to said overlapping segments.
   E. means for mounting said said support means with respect to said transducer means in a manner to permit relative displacement of said working and support surfaces towards and away from each other for engagement with the opposite sides of the overlapping segments for applying a compressive force thereto, said means for mounting said support means includes
      1. a pair of legs extending in surrounding relation to said transducer means and having said gripping means extending therefrom,
      2. means securing said legs together,
      3. means coupling said support means to one of said legs at one end thereof below said tool member, said means coupling said support means to one of said legs includes
         a. a slot on said leg, and b. a fastener extending from said transducer means and within said slot on said leg to provide the axial alignment therebetween, 4. means mounting said transducer means relative to said legs to permit axial movement relative thereto, and 5. spring means extending between said transducer means and said legs to provide a static force to assist in said suture forming, F. tension means to retain said suture thread in a fixed position relative to said support means, wherein as said transducer means is moved relative to said support means a tension is applied to the suture thread to bring the adjacent surfaces into a set position and said overlapping segments of suture thread are joined together by the combined action of the applied compressive force and ultrasonic vibrations, and G. gripping means for manually controlling the relative displacement of said support means and said tool member, said gripping means operatively associated with said means for mounting said support means.

6. Apparatus as claimed in claim 5 wherein the depth of said groove is less than the thickness of the suture segments positioned therein in overlapping relationship.

7. Apparatus as claimed in claim 5, wherein said support means has a tapered front portion to facilitate placement below the suture.

* * * * *